(12) United States Patent
Mildner et al.

(10) Patent No.: US 9,721,729 B2
(45) Date of Patent: Aug. 1, 2017

(54) VACUUM VARIABLE CAPACITOR

(71) Applicant: COMET AG, Flamatt (CH)

(72) Inventors: Mark Joachim Mildner, Rizenbach (CH); Roland Bieri, Selzach (CH); Mike Abrecht, Thörishaus (CH); Walter Bigler, Heitenried (CH); Douglas Beuerman, Boulder Creek, CA (US); Jack Gilmore, Fort Collins, CO (US)

(73) Assignee: COMET AG, Flamatt (CH)

( * ) Notice: Subject to any disclaimer, the term of this patent is extended or adjusted under 35 U.S.C. 154(b) by 32 days.

(21) Appl. No.: 14/891,584

(22) PCT Filed: May 28, 2014

(86) PCT No.: PCT/EP2014/061160
§ 371 (c)(1),
(2) Date: Nov. 16, 2015

(87) PCT Pub. No.: WO2014/191510
PCT Pub. Date: Dec. 4, 2014

(65) Prior Publication Data
US 2016/0093445 A1    Mar. 31, 2016

(30) Foreign Application Priority Data

May 30, 2013    (WO) .................. PCT/EP2013/061174

(51) Int. Cl.
*H01G 5/013*    (2006.01)
*H01G 5/01*    (2006.01)
(Continued)

(52) U.S. Cl.
CPC ............ *H01G 5/013* (2013.01); *H01G 5/011* (2013.01); *H01G 5/014* (2013.01); *H01G 5/04* (2013.01);
(Continued)

(58) Field of Classification Search
CPC    H01G 4/02; H01G 5/14; H01G 4/255; H01G 5/013; H01G 5/014; H01G 5/011; H01G 5/16; H02M 7/54
(Continued)

(56) References Cited

U.S. PATENT DOCUMENTS 6,064,559 A * 5/2000 Church, Jr. ............... G01D 5/34
361/272
2002/0048136 A1    4/2002 Nemoto et al.
(Continued)

FOREIGN PATENT DOCUMENTS

GB    1208393 A    10/1970
GB    1574197 A    9/1980
(Continued)

OTHER PUBLICATIONS

International Search Report (Aug. 25, 2014) for corresponding International App. PCT/EP2014/061160.

*Primary Examiner* — Eric Thomas
*Assistant Examiner* — Arun Ramaswamy
(74) *Attorney, Agent, or Firm* — WRB-IP LLP

(57) ABSTRACT

A vacuum variable capacitor includes a pre-vacuum enclosure for reducing a pressure differential across the bellows, wherein a drive is disposed outside the enclosures of the vacuum variable capacitor. The vacuum force load on the drive system can thereby be reduced, allowing faster movement of the movable electrode, faster capacitance adjustment of the vacuum variable capacitor and longer lifetimes of the device.

13 Claims, 5 Drawing Sheets

(51) Int. Cl.
  *H01G 5/00* (2006.01)
  *H01G 5/014* (2006.01)
  *H01G 5/04* (2006.01)
  *H01G 5/14* (2006.01)
  *H01G 5/38* (2006.01)
  *H01G 5/011* (2006.01)

(52) U.S. Cl.
  CPC ............... *H01G 5/145* (2013.01); *H01G 5/38* (2013.01); *H01G 2005/02* (2013.01)

(58) Field of Classification Search
  USPC .................................. 361/273, 278, 279, 289
  See application file for complete search history.

(56) References Cited

U.S. PATENT DOCUMENTS

| | | |
|---|---|---|
| 2010/0202094 A1 | 8/2010 | Jaggi et al. |
| 2013/0038978 A1 | 2/2013 | Takahashi et al. |

FOREIGN PATENT DOCUMENTS

| | | |
|---|---|---|
| JP | H1167590 A | 3/1999 |
| JP | 2010135439 A | 6/2010 |

* cited by examiner

VACUUM VARIABLE CAPACITOR

BACKGROUND AND SUMMARY

The present invention relates to the field of vacuum variable capacitors.

Vacuum variable capacitors are useful for example in impedance matching networks in which the impedance of a time-dependent high-frequency load can be matched with that of a generator by adjusting one or more vacuum variable capacitors. The capacitance of such capacitors can be controllably adjusted by moving one electrode, or set of electrodes, with respect to the other, and the use of vacuum as the dielectric medium allows their use in high power applications, for example operating at voltages in the kV range or several tens of kV voltages, carrying currents up to several hundred ampere, and at frequencies as low as 200 kHz or as high as 200 MHz. Such capacitors can be used as the tuning element in high-power impedance matching networks and are often used for high power radio-frequency (RE) applications requiring fast, controllable, reliable capacitance adjustment over a large range (typically about 1:50 or more) with high resolution (typically more than 10000 setpoints in the range) and operating lifetimes of many years.

Vacuum capacitors typically comprise a pumped and sealed enclosure, said enclosure typically comprising two metallic collars electrically insulated form each other by a cylindrical (tubular) ceramic or other electrically insulating) piece joined in a vacuum tight manner to the aforementioned collars. Inside the enclosure and conductively attached to each metallic collar are electrodes whose function (together with the vacuum dielectric) is to generate electric capacitance. The cylindrical ceramic also contributes to the total capacitance but is rarely a significant contribution. Typically one electrode is mechanically fixed to one collar and the other electrode can be either stationary also, or it can be moved from outside the vacuum enclosure by means of a drive system. The movable electrode is therefore not rigidly attached to the collar but is attached at one end of an expandable joint (such as metallic bellows). The other end of the expandable joints is attached to the collar.

In most cases the expandable joint is also a hermetic seal separating the room inside the enclosure (which is at a vacuum) from the non vacuum side (at atmosphere). The drive system typically comprises a screw and nut system moving a shaft along a guiding tube, said moving shaft permits to compress or expand the expandable joint. Therefore axial movement of the screw/nut guiding system outside the vacuum is transferred to axial movement of the movable electrode inside the vacuum typically by means of the expandable joint, hereafter generally referred to as a bellows, although other expandable joints may be used. The vacuum dielectric medium gives the name to such capacitors. The vacuum pressure is typically better (lower) than 10-4 mbar. Using vacuum as a capacitor dielectric has the advantages of stable dielectric value in particular no temperature, nor frequency dependencies), and allows stable operations of the capacitor at high voltages and high currents with very low dielectrical losses. For example, Publication US2010202094 (A1) describes a vacuum variable capacitor. Some specific applications of vacuum capacitors include broadcasting (e.g. in an oscillation circuit of a high power transmitter) or plasma controlling processes in the semiconductor, solar and flat panel manufacture, for example during industrial Plasma-Enhanced Chemical Vapor Deposition (PECVD) processes. In such applications, adjusting the capacitance of the vacuum variable capacitors allows to change and match) the impedance between RF loads (such as those generated by the PECVD processes) and the fixed impedance of a high power RE generator, fixed by industry standard to $Z_{Generator}^{out}=(=+0j)$ Ohm. Failing to match the impedance would result in electric power not being delivered to the process, but instead being reflected back into the generator which could lead to its destruction.

Vacuum capacitors are therefore the key tunable element for RF power transfer to varying loads. Despite being relatively bulky, vacuum variable capacitors offer several advantages compared to other tuning mechanisms such as inductive tuning, or other forms of capacitive tuning (non-mechanical technology or non vacuum-technology). Indeed, vacuum variable capacitors allow nearly continuous tuning and have an excellent resolution (capacitance range can easily be divided into more than 10000 setpoints when the micro-step features of a typical stepper motor is used) over a very large capacitance range and have very high voltage capabilities thanks to the vacuum dielectric. Moreover, because of the extremely low dielectric losses, vacuum capacitors allow large currents without generating much heat and consequently are essentially unrivalled for the most demanding power applications. The adjustment of the capacitance value is achieved by mechanically moving, one electrode with respect to the other electrode, thereby either modifying the distance between the two electrode surfaces or modifying the electrode surface overlap (the latter is most common), both of which result in a change of the capacitance value.

Typical vacuum variable capacitors for MHz applications are designed to provide capacitance values in the pF range (sometimes extending into the low nF range), whereas a single unit cover a capacitance range of approximately 1:50 or more; that is, if the minimum setting Cmin is for example 10 pF, then a maximum of Cmax=500 PF can typically be set using the same unit. The time taken to move the movable electrode between Cmin and Cmax is typically 1 s or more in prior art capacitors. A smaller adjustment requires a roughly proportionally smaller amount of time. Recently, the adjustment times during, and in between consecutive plasma processes used in chip manufacturing or other semiconductor manufacturing processes have shrunk considerably, so that vacuum variable capacitors have sometimes become the bottleneck element in impedance matching and in the overall processes using radio frequency power. While there is progress towards more rapid control software, there are physical limitations on the speed with which a mechanical part (the moving electrode) can be moved using a given motor. One limiting factor on the speed is the motor power required to counter the significant force due to the pressure differential (1 bar) between the inside and the outside of the vacuum tight enclosure.

State of the art vacuum variable capacitors are thus limited in speed primarily by the power of the motor and by the pressure-velocity limit (so-called PV value) of the screw and nut of the drive system used to move the movable electrode of the capacitor. A high PV value of the application leads to a high contact pressure between the nut and the screw threads of the drive system, negatively affecting the wear of said screw/nut system and resulting in earlier failures (or alternatively requiring regular exchange of screw/nut system).

Prior art capacitors also suffer from significant membrane stresses and bending stresses in the bellows. The greater these stresses, the smaller the number of compression/expansion cycles (lifecycles) which the bellows can endure before they fail.

Irrespective of the type of motor being used for the drive system, a high torque is inevitably required to work against the pressure differential of a prior art vacuum variable capacitor, as explained hereafter.

Stepper motors are typically used to drive vacuum variable capacitors because of their positioning accuracy (resolution), high stiffness (stepper motors develop their maximum holding torque at standstill and typically do not require any brake), and because they have satisfactory speeds for most applications. Typically stepper motors can run at 600 RPM or 1200 RPM to drive most common vacuum variable capacitors and still provide enough torque to work against the vacuum force. Unfortunately, however, one property of stepper motors is that increasing the speed decreases the available torque, which, at very high speeds, results in step loss and inaccuracy. Other motors (such as servo-motors, or linear motors) also have decreasing torque at high speeds. Obtaining a combination of higher torque and speed is only possible by drastically increasing the size and cost of the motor. This is not an acceptable option for components integrated into OEM (original equipment manufacturer) impedance matching networks.

The present invention aims to overcome the above and other disadvantages with prior art vacuum variable capacitors. In particular, it is desirable to provide an improved vacuum variable capacitor in which the adjustment speed is increased, but preferably without increasing the size of the motor, without increasing the size of the device, and/or without reducing the adjustment resolution of the device.

Additional advantages may include an increase in the lifetime of the device (in particular an increase of the number of capacitance adjustment cycles), without compromising on the maximum operating voltage/power, compactness of the device, or its adjustment resolution.

According to an aspect of the invention, a vacuum variable capacitor is provided, adjustable between a minimum capacitance value and a maximum capacitance value, and comprising:

a first vacuum enclosure (also referred to as primary vacuum enclosure) containing capacitor electrodes separated by a vacuum dielectric, the wall of the first vacuum enclosure comprising a first deformable region (also referred to as bellows) for transferring mechanical movement between a drive means and a mobile one of the capacitor electrodes inside the first vacuum enclosure; and a second enclosure, referred to as the pre-vacuum enclosure, containing a gas at a predetermined pressure, lower than atmospheric pressure, the pre-vacuum enclosure being arranged such that the first deformable region separates the pre-vacuum enclosure from the first vacuum enclosure.

The second enclosure (also referred to as a pre-vacuum or secondary enclosure) contains a gas, preferably at a pressure below atmospheric pressure, and thereby serves to reduce the pressure differential across the bellows. This reduction in pressure differential in turn reduces the amount of motor torque which is required to move the bellows and/or increases the adjustment speed which can be achieved using a given motor.

The drive means is disposed outside the enclosures of the vacuum variable capacitor. Therefore optimal convection for the cooling of the drive means, in particular a motor running the drive means, is provided. The drive means transfers its movement to a driven means inside the vacuum variable capacitor, in particular inside the second enclosure. Depending on the selected drive system, drive means and driven means can be differing embodiments.

In one embodiment the drive means comprises a contact free transfer of its movement to a driven means inside an enclosure of the vacuum variable capacitor. Preferably the drive means is coupled to a driven means by a magnetic coupling. For example the drive means may comprise a first rotating magnetic plate and the driven means may comprise a second magnetic plate that is rotated by magnetic force of the first magnetic plate. The first magnetic plate may e.g. be rotated by a motor. The second magnetic plate can be connected to a screw/nut system. Also the drive means may be an induction motor and the driven means may be a voice-coil or the like. Advantageously the magnetic coupling comprises a shielding to be shielded from any electromagnetic fields during the operation of the vacuum capacitor.

In an other embodiment the drive means may be realized as a screw/nut system, wherein the drive means is realized by a motor comprising a shaft with a screw section, wherein the shaft extends from outside the enclosures into an enclosure of the vacuum variable capacitor. The driven means is realized at least by the nut inside the enclosure.

The presence of the pre-vacuum enclosure means that the motor needs less torque in order to drive the nut and compress or expand the bellows and move the movable electrode(s) inside the first vacuum enclosure. This allows faster speeds using a motor of the same size and power. Note that the reduction in torque required is not due merely to the reduction in the vacuum force on the bellow. The vacuum force gives rise to a significant contact force (friction) between the nut and the screw. A reduction in the pressure differential, and hence in the vacuum force, results in a significant decrease in the amount of rotational friction between the nut and the screw thread. This reduced rotational friction also results in a significant decrease in the amount of torque required by the motor to drive the shaft.

The pre-vacuum enclosure does not need to be pumped down as much as the primary vacuum. Indeed the primary vacuum pressure must be many orders of magnitude less than the atmospheric pressure in order to perform adequately as a dielectric, whereas the pressure in the pre-vacuum enclosure may merely be one order of magnitude less than the atmospheric pressure, for example, which is already sufficient to reduce the axial force acting on the drive system (the screw/nut etc.) by about a factor of 10. With the reduced force acting on the drive system, the required torque of the motor is reduced considerably which allows for higher speeds.

Moreover, the arrangement can increase the lifetime of the bellows, which separates two volumes under a reduced pressure differential and will therefore be subject to less membrane stress and less bending stress upon compression/expansion. The reduced vacuum force also leads to a reduction in the wear of the screw-and-nut drive system, thus leading to longer lifetimes of those components.

In one embodiment, an improved variable vacuum capacitor is achieved by having a motor running the drive means, for example a stepper motor, outside either of the two vacuum enclosures (i.e. the motor is at atmospheric pressure). This allows optimal convection cooling of said motor.

By further using a magnetic coupling between the parts of the drive system on the atmospheric, side and the parts of the drive system in the pre-vacuum enclosure, one achieves a contact free transfer of movement between the motor and the drive system parts in the pre-vacuum enclosure: the transmission of the rotational movement from the drive means to the driven means is purely done with a magnetic coupling. With this arrangement, even though there is a pressure differential of nearly 1 atm between the pre-vacuum enclosure and the motor area, none of the moving parts are subjected to an force resulting from that pressure differential.

Due to vacuum capacitors typically being operated in or near high electromagnetic the magnets of the magnetic coupling need to be shielded from such fields for proper operations.

Because the pressure differential between the pre-vacuum enclosure and the primary vacuum enclosure is not significant (it can be chosen for example to be of the order of ≈0.1 atm), there is much less stress on the bellows separating the two vacuum enclosures compared to today's bellows in vacuum capacitors. Therefore, the mechanical properties of the bellows become less stringent compared to those used in today's vacuum capacitors, for which 1 atm of pressure differential always exists across the bellows (due to the non-existence of a pre-vacuum enclosure in today's vacuum capacitors). This invention therefore permits, either longer bellows lifetime with existing bellows, or alternatively permits more choices of materials for bellows. It is furthermore possible to use other shapes of expandable joints instead of conventional bellows.

For the same reason of reduced pressure differential and resulting reduced force, the required "Pressure*Velocity (PV)" value of the screw/nut pair or pair of magnetic plates of the drive system in the pre-vacuum enclosure becomes lower (lower P) which allows for higher velocities and/or longer lifetimes of the screw/nut system.

Most importantly, because the vacuum force is essentially eliminated, the required torque of the motor, in particular of a stepper motor to achieve movement is reduced. Thanks to the reduced required torque, the motor, in particular a stepper motor, can run at higher speeds without step loss and therefore perfect accuracy is maintained in controlling the mobile electrode's position and associated capacitance value of the vacuum variable capacitor up to much higher speeds than today's state of the art vacuum variable capacitors.

In one embodiment of a vacuum variable capacitor according to the invention, the electrodes, the drive means and the pre-determined pressure in the pre-vacuum enclosure are configured so that the minimum adjustment time between the minimum capacitance value and the maximum capacitance value is less than 0.1 s. The maximum capacitance value can be at least 10 times greater than the minimum capacitance value.

In one embodiment of a vacuum variable capacitor according to the invention, the bellows are configured to sustain 10 million cycles, where one cycle comprises a first capacitance adjustment from a first capacitance value to a second capacitance value, where the second capacitance value is ten times the first capacitance value, and a second capacitance adjustment from the second capacitance value to the first capacitance value. The electrodes and the motor for the drive means are configured so that the minimum adjustment time for one of said cycles is less than 0.05 s.

In one embodiment of a vacuum variable capacitor according to the invention, control means for controlling the motor (15) and the drive means respectively is provided, wherein the control means, the motor and the drive means are configured such that the capacitance is adjustable in increments smaller than 1/5000th of the difference between the maximum and the minimum capacitance values.

The fast vacuum variable capacitor described here may for example be configured with the motor located outside the pre-vacuum enclosure, and with the gas in the pre-vacuum enclosure at a pressure of approximately 0.1 bar, for example. A pressure of 0.1 bar diminishes the vacuum force on the bellows by approximately 90% but still provides enough molecules to allow convection cooling so that the motor does not overheat. A better vacuum (a lower pressure) may not allow enough heat to be evacuated towards the outside environment leading to overheating of the motor and failure of the system. Generally, a pressure of between 0.05 bar and 0.5 bar has been found to offer a useful reduction in vacuum force, without the need for extra cooling measures. However, any pressure up to atmospheric pressure may be used, and still offer an improvement.

In principle, the vacuum force could be reduced to zero by fully evacuating the pre-vacuum chamber. This would reduce the required motor torque for (driving the screw/nut or the magnetic coupling to a very small value. However, the vacuum force provides a useful axial biasing force on the screw-nut drive. This axial biasing force significantly reduces the amount of play in the screw/nut drive, and thereby contributes to the accuracy (resolution) of the capacitor adjustment. The bellows may have an inherent spring-like force, which also has the effect of biasing the screw-nut mechanical interface. However, the bellows may be under compression at one point in its extension range, and in tension in another part of its extension range, so it will exert a positive and a negative biasing force on the drive screw/nut, depending on where in its extension range the bellows happens to be. Thus, it is advantageous to configure the pressure differential across the bellows such that the vacuum force is greater than the maximum bellows spring force acting in a direction opposite to the vacuum force. In other words, the resultant "vacuum force+bellows spring force" should not change orientation even when the bellows go through their neutral position (from being compressed to being extended). Indeed although the bellows force alone would change orientation depending whether it is operated in compression mode or in extension mode, the adding of the (diminished) vacuum force still ensures that the sum of the forces does not change orientation. This can be guaranteed by having the secondary vacuum pressure high enough to at least equalize the maximum amplitude of the bellows spring force of the capacitor. A change of orientation of the resultant force would allow backlash in the screw-nut system or the magnetic coupling resulting in an inferior position control of the capacitor (and associated capacitance and impedance values). In other words, the diminished vacuum force should be determined so that it is still just big enough to compensate any bellows force in an opposite direction (this will depend on the mechanical properties of the bellows used).

For similar reasons, another advantage of a reduced but not fully compensated vacuum force, is that the capacitor can be positioned and integrated in any orientation into an impedance matching network provided that the reduced vacuum force still at least also compensates the gravitational force which applies on the movable electrode when the bellows axis is not horizontal. A pressure of 0.1 bar was found to be appropriate with typical choices of bellows and electrode mass. However, in other situations a higher or lower pressure may be more effective.

BRIEF DESCRIPTION OF THE DRAWINGS

The invention will now be described in detail, with reference to the accompanying drawings, in which.

The figures are provided for illustrative purposes only, and should not be construed as limiting the scope of the claimed patent protection.

Where the same references have been used in different drawings, they are intended to refer to similar or corresponding features. However, the use of different references does not necessarily indicate a difference between the features to which they refer.

DETAILED DESCRIPTION

Figure 1:
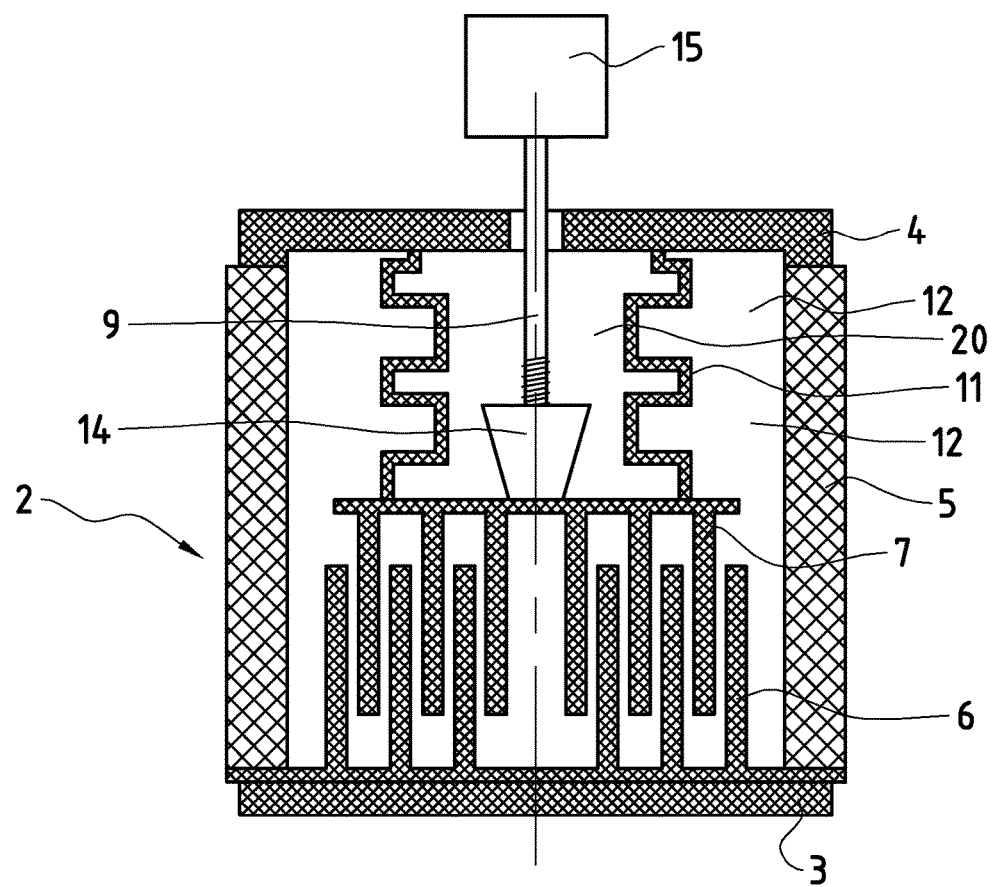
FIG. 1 shows, in schematic cross-sectional view, a prior art vacuum variable capacitor.

FIG. 1 shows a highly simplified, diagrammatical cross-section of an example of a prior art vacuum variable capacitor. It comprises a pumped and sealed vacuum enclosure (2) formed with two metallic collars (3, 4) electrically insulated from each other by a cylindrical ceramic piece (5) joined in a vacuum tight manner to the collars (3, 4). Inside the enclosure (2) and conductively attached to each metallic collar (3, 4) are a static electrode (6) and a movable electrode (7) whose function, together with a vacuum dielectric (12), is to generate electric capacitance. The static electrode (6) is mechanically fixed to one collar (3) and the movable electrode (7) can be moved by means of a drive system comprising a lead screw (9) and nut (14). An expansion joint or bellows (11) separates the vacuum dielectric (12) from the atmospheric pressure outside the vacuum enclosure (2). Note that there is a force due to the pressure differential ($\Delta P \approx 1$ bar) that acts on the bellows (11) and the contact surface between the nut (14) and the lead screw (9). To change the capacitance value of the vacuum variable capacitor, the overlap of the electrodes (6) and (7) may be adjusted by turning the screw (9) an appropriate number of turns or fraction of turns. This is done by typically using a motor (15). The vacuum force, which can be as much as 300N or more, acts on the bellows (11) to pull the bellows and the nut towards the vacuum (i.e. downwards in FIG. 1). The magnitude of the vacuum force depends on the geometry of the bellows (11), which form the interface between the vacuum (12) and the surrounding atmosphere. This leads to a high torque requirement for the motor (15), which in turn limits its speed, as discussed above.

Figure 2:
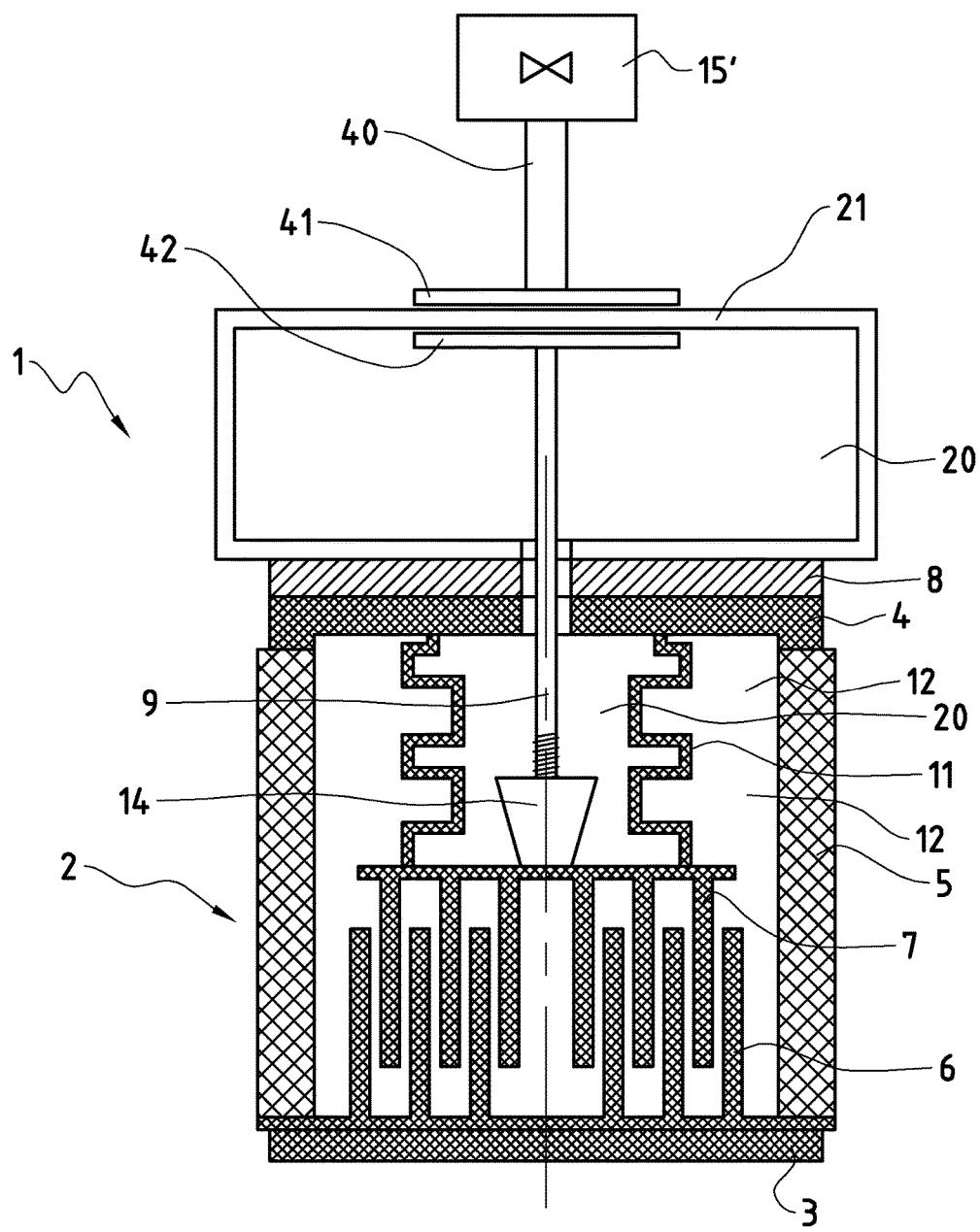
FIG. 2 shows, in schematic cross-sectional view, an example of a vacuum variable capacitor according to a first embodiment of the invention comprising a drive means outside the enclosures of the vacuum variable capacitor.

FIG. 2 shows, in similarly simplified form, an example of a vacuum variable capacitor (1) according to a first embodiment of the present invention. It comprises a first vacuum-tight enclosure (2), electrodes (6, 7), motor (15'), lead-screw (9), nut (14) and bellows (11). The motor (15') is for example a stepper motor. In addition, a low-pressure enclosure (21), also referred to as a partial vacuum, pre-vacuum or second enclosure, is sealed to the first vacuum enclosure (2). The pre-vacuum enclosure (21) may contain a gas (20) at a pressure lower than atmospheric pressure, for example 0.1 bar.

Instead of separating the vacuum dielectric (12) from the atmosphere, as in FIG. 1, the bellows (11) of FIG. 2 now separate the vacuum dielectric (12) from the low-pressure gas (20) contained within the sealed pie-vacuum enclosure (21).

If the pressure in the pre-vacuum enclosure is 0.1 bar, then the vacuum force acting on the bellows (11) and the nut (14) will be approximately one tenth of the corresponding vacuum force in the vacuum variable capacitor illustrated in FIG. 1.

Because the vacuum force is reduced, the torque required by the motor (15') is also smaller than for the vacuum variable capacitor of FIG. 1.

It can be noticed that in this embodiment according to the present invention the motor (15') is connected to a drive means (40), that is used to drive the lead screw (9). Thus, in this embodiment the lead screw (9) serves as a driven means to adjust the overlap of the electrodes (6) and (7). In this example, the drive means (40) includes an axle of the stepper motor. The motor (15') and the drive means (40) are located outside the pro-vacuum enclosure (21). The drive means (40) and the driven means are connected to a magnetic coupling. The axle of the motor (15') is fixed to a first magnetic plate (41), that is moveably arranged along a wall of the second enclosure (21) and outside the second enclosure (21). Because the first magnetic plate is rigid with the axle, it can be regarded as being part of the drive means. The first magnetic plate (41) is located opposite to the lead screw (9) arranged within the second enclosure (21). The lead screw (9) is fixed to a second magnetic plate (42), that is moveably arranged along the wall of the second enclosure (21) on the inside of the second enclosure (21). The second magnetic plate (42) is rigid with the lead screw (9) and is part of the driven means. The movement, of the drive means (40) is transferred to the driven means by the magnetic force between the magnetic plates (41) and (42). This set-up permits a contact free transfer of movement between the motor (15') and the movable electrode (7), with the additional advantage that the previously defined "vacuum force" acting on the bellows (11) and the contact surfaces of the threads of screw (9) and nut (14) can be reduced of even totally eliminated by a judicious lowering of the gas pressure inside the second enclosure (21)

Although FIG. 2 shows an insulation (8) between the container of the pre-vacuum enclosure (21) and the metallic collar 4 of the first vacuum enclosure (2), it would not be necessary in this set-up, provided the motor is still electrically insulated from the high voltage of the capacitor. In this set-up, the air gap resulting from the contact free design may offer sufficient insulation, or the motor (15') can be purposely insulated with an additional part which would preferably be positioned directly between the motor (15') and the axle of the drive means (40). The insulation is mentioned later in the description.

The collar (4) on the variable side of the vacuum variable capacitor (1) is often referred to as the "variable mounting plate". It is used to mount the vacuum variable capacitor into an impedance matching network or other system. A different electrode arrangement inside the first vacuum tight enclosure (2) allows to simplify the mounting of the drive system, as will be explained in relation to the second embodiment of the invention.

Coming back to the present embodiment (FIG. 2), let us assume that the pressure in the pre-vacuum enclosure (21) is 0.1 bar for the following discussion about the increase of the lifetime of the vacuum variable capacitor.

Firstly, the bellows (11) lifetime improves because the pressure differential ($\Delta P$) across the bellows (11) is now reduced by 90%, and this reduction will produce lower membrane stress and lower bending stress of the bellows (11) in extension or compression, thus leading to an extended lifetime. Secondly, the lifetime of the screw (9) and nut (14) is also improved, because the PV value is reduced thanks to the lower pressure value. PV is the product of pressure and velocity, where the pressure and velocity here are those at the contact surfaces of the mating threads of the screw (9) and nut (14). The PV value is a common engineering value that may be used to predict mechanical wear and the time to failure of two sliding surfaces in contact such as those of screws and nuts. A decreased pressure difference across the bellows (11) results in a lower contact pressure between the mating thread surfaces of the screw (9) and the nut (14). With the vacuum variable capacitor (1) illustrated in FIG. 2, the reduction in contact pressure between screw (9) and nut (14) gives rise to one or more of the following beneficial properties:

For a given screw/nut pairing, less wear and longer lifetimes;

For a given screw/nut system and the same lifetime requirements, it allows the screw/nut drive system to operate at faster speeds without reducing lifetime;

Choosing a less expensive combination of screw/nut materials and still reaching, the same lifetimes at the same speeds;

Choosing smaller screws and nuts (and therefore contributing to the miniaturization of the vacuum capacitor) without reducing lifetime.

As mentioned before the motor (15') may be a stepper motor, for example. Alternatively, one may use other types of DC motors or AC servo motors.

Figure 3:
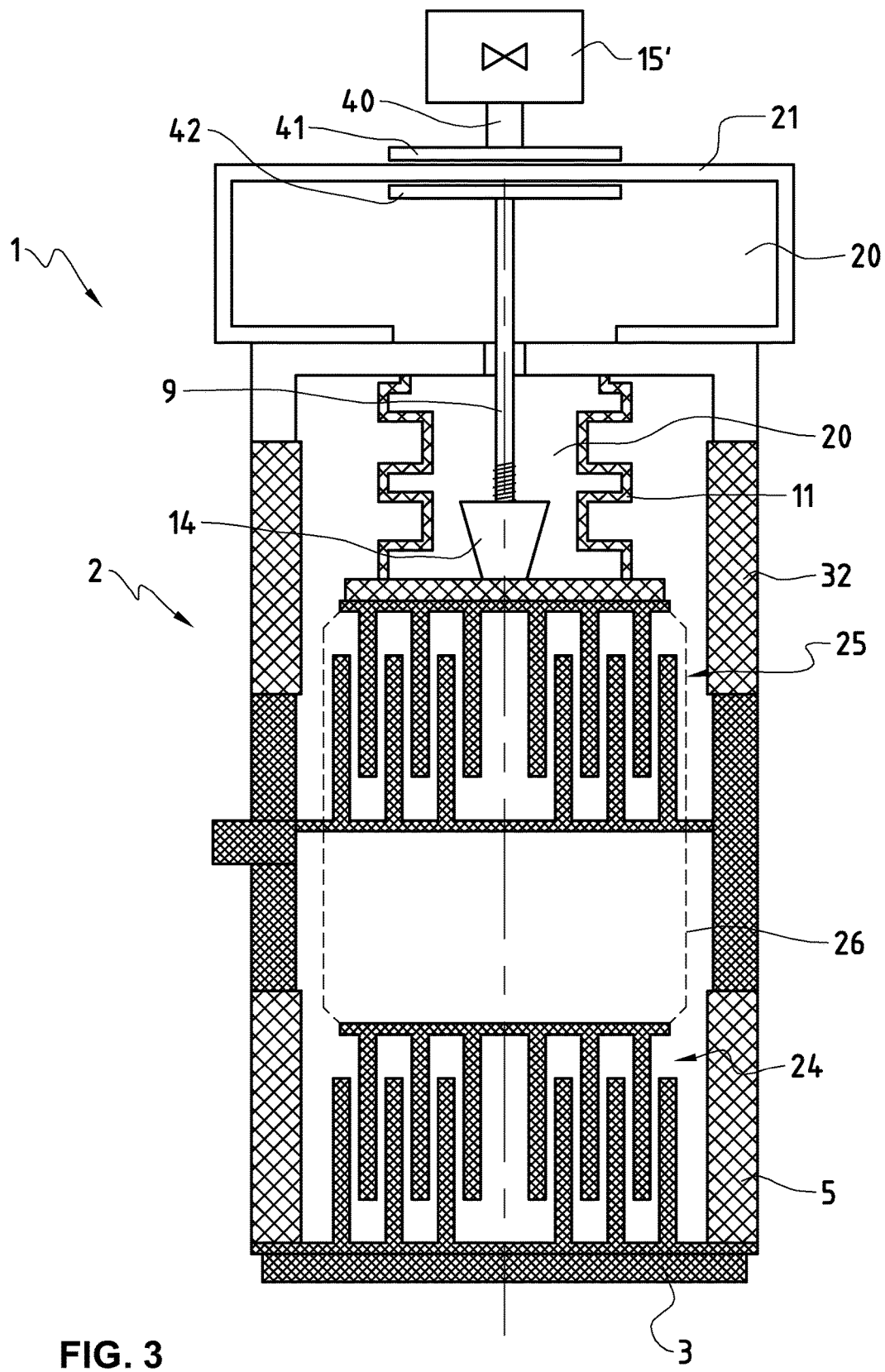
FIG. 3 shows, in schematic cross-sectional view, an example of a vacuum variable capacitor according to a second embodiment of the invention.

FIG. 3 shows an example of a vacuum variable capacitor according to a second embodiment of the present invention. In this example, the arrangement of two ganged sets of electrodes (24, 25) inside the first vacuum enclosure (2) and the use of a second ceramic insulator (32) as part of the vacuum enclosure (2) makes it possible to connect the motor (15'), located outside the pre-vacuum enclosure (21). Optionally the pre-vacuum enclosure may provide an insulating piece to electrically insulate the motor from the high voltages applied during operations of the vacuum variable capacitor (1). Again the motor (15') with its drive means (40) is arranged outside the pre-vacuum enclosure (21) and coupled to the driven means by a magnetic coupling comprising first and second magnetic plates (41) and (42) as already described for the second embodiment shown in FIG. 2.

As can be seen in FIGS. 2 and 3 the motor (15') and the drive means (40) are located outside the pre-vacuum enclosure (21), while the driven means in form of the lead screw (9) is located inside the pre-vacuum enclosure (21). The pre-vacuum enclosure (21) serves as a pressure vessel, for reducing the pressure differential across the bellows (11). The design of such a pre-vacuum enclosure offers quite some flexibility: for example, it is conceivable that by using a valve and a pumping system (not shown in FIG. 3) the pressure inside the pre-vacuum enclosure could be dynamically adjusted to not only counteract statically the vacuum force, but also to counteract dynamically the varying spring-like force of the bellows being compressed or extended.

Figure 4:
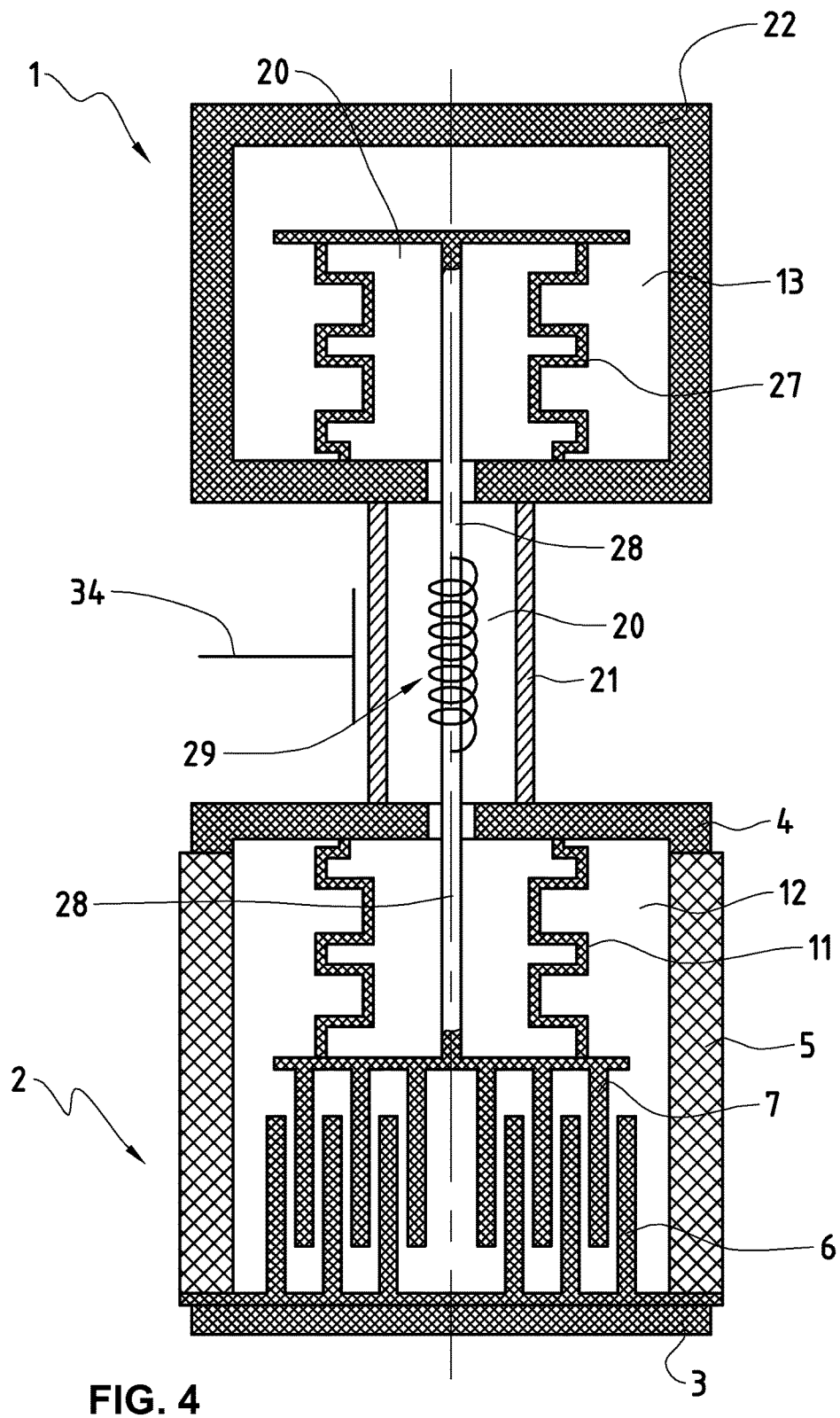
FIG. 4 shows, in schematic cross-sectional view, an example of a vacuum variable capacitor according to as third embodiment of the present invention.

FIG. 4 shows an example of a vacuum variable capacitor (1) according to a third embodiment of the present invention, which comprises, as in the first and second embodiments, a first vacuum enclosure (2) containing electrodes (6, 7) in a vacuum (12), and bellows (11), which separate the vacuum (12) from a pre-vacuum enclosure (21) containing a gas (20) at low pressure, as described in relation to the first and second embodiments.

The vacuum variable capacitor of FIG. 4 also comprises a third vacuum enclosure (22) and second deformable wall region, or bellows (27), which are constructed such that the net vacuum force of the second bellows (27) due to the pressure differential between a third vacuum (13) and the pre-vacuum gas (20), and the bellows spring force of the second bellows (27), are substantially the same as but acting in the opposite direction to, the corresponding net vacuum force and bellows spring force on the first bellows (11).

As shown in FIG. 4, the first and second bellows are connected by a mechanical linking means (in this case a common shaft, 28), which ensures that the vacuum force and the spring like forces acting on the bellows (11) and the linking means (28) are exactly compensated by the vacuum force and the spring like force acting on the bellows (27) and linking means (28). As a result, the linking means (28) is subjected to a zero resultant force. Therefore the linking means, in particular a common shaft, can be controllably and speedily moved by a rather weak driving force, such as for example that of a linear induction motor or voice call (34, 29) or other appropriate device. This allows the movable electrode (7) of the variable vacuum capacitor to be moved easier and faster and therefore allows improved capacitance adjustments as compared to previous art variable vacuum capacitors.

Various possible mechanical linkages can be envisaged for linking the two bellows (11 and 27), but a straight-through shaft (28), fixed at either end to the respective end portions of the first (11) and second (27) bellows has the advantage that it requires no threaded joint or other moving parts.

FIG. 4 shows an arrangement in which the first (2) and second (22) vacuum enclosures share a common pre-vacuum enclosure (21) for reducing the pressure differential across the respective bellows (11, 27). However, it would be possible to use two separate pre-vacuum enclosures to achieve the same result.

With this arrangement, it is therefore particularly advantageous to use a linear drive or any other moving means which do not contain a screw and nut. Furthermore with this embodiment, the force necessary to adjust the vacuum variable capacitor is reduced even more than in the previously discussed embodiments, and even higher speeds can be achieved. A linear motor (34) outside the enclosures as drive means and a voice-coil (29) inside the pre-vacuum enclosure (21) as driven means, such as a linear induction or voice-coil type motor, can for example be used to adjust the vacuum variable capacitor of FIG. 4. Furthermore, because the nett vacuum and spring forces on the bellows are effectively reduced to zero, the capacitance adjustment speed does not depend on the pressure in the pre-vacuum enclosure (21). The pressure in the pre-vacuum enclosure (21) could thus be any value, including atmospheric pressure, or a higher-than-atmospheric pressure. Indeed, the vacuum variable capacitor of the third embodiment may dispense with the pre-vacuum enclosure (21) altogether. The pressure in the second vacuum enclosure (21) can be the same as in the first vacuum enclosure (2) and/or the third vacuum enclosure (22). The vacuum/spring forces transmitted by the bellows (11, 27) to the mechanical linkage (26) would still be cancelled out.

Figure 5:
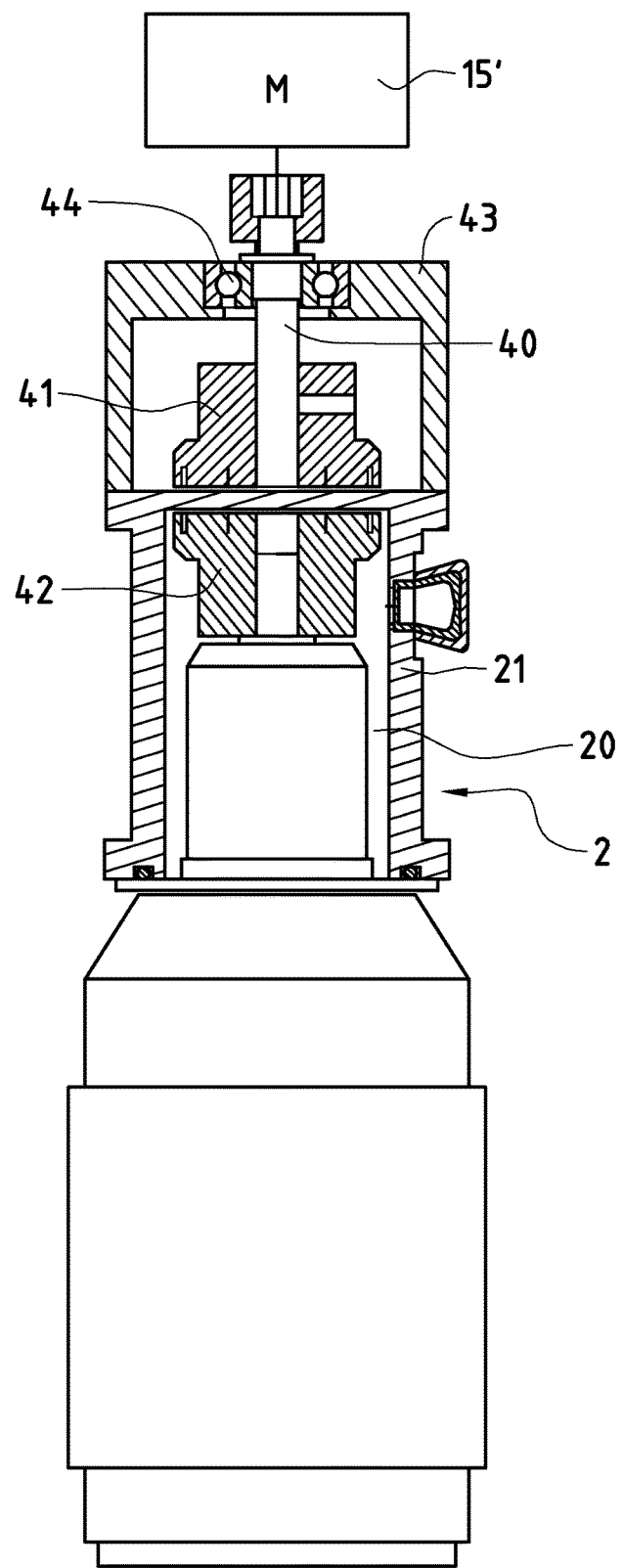
FIG. 5 shows, in schematic cross-sectional view, a further example of a vacuum variable capacitor according to a fourth embodiment of the present invention.

FIG. 5 shows a further example of a vacuum variable capacitor according to a fourth embodiment of the present invention. The general set up of the electrodes (6) and (7), the bellows (11), the lead screw (9) and the nut (14) of the capacitor is realized as shown in FIG. 2. In FIG. 5 the drive means (40) is housed in an enclosure (43) and supported by bearings (44). The magnetic plates (41) and (42) are realised as magnetic blocks in the enclosures (43) and (21) respectively. The magnets are chosen strong enough to guarantee a perfect orientational coupling of the blocks and the respective parts they are attached to in their respective enclosures (43) and (21). Any "slipping" of the two rotationally coupled systems should be avoided during movement and more critically during acceleration and deceleration.

The arrangement of the motor (15') outside the vacuum enclosures of the vacuum variable capacitor allows a simple design of the capacitor with several vacuum enclosures and facilitates maintenance of the capacitor. However, while some motors are known to work in outer space and are therefore vacuum compatible, it is not feasible to integrate directly an electric motor into the primary vacuum enclosure (2) containing the electrodes. The reason is that even such motors outgas and degrade the vacuum required for dielectric purposes: vacuum pressures better (lower) than 10-3 mbar, preferably lower than approximately 10-4, are necessary to be maintained, but those were found to be incompatible with long term outgassing rates of motor parts A worsening of the vacuum quality (i.e. an increase of pressure for example due to outgassing phenomena of motor parts) in the primary enclosure (2) beyond a threshold value (given by the well-known "Paschen law") will result in the failure of the vacuum capacitor by voltage breakdown.

The invention claimed is:

1. A vacuum variable capacitor adjustable between a minimum capacitance value and a maximum capacitance value, the vacuum variable capacitor comprising:
   a first vacuum enclosure containing capacitor electrodes separated by a vacuum dielectric, the wall of the first vacuum enclosure comprising a first deformable region, hereafter referred to as first bellows, for transferring mechanical movement between a drive means and a mobile one of the capacitor electrodes inside the first vacuum enclosure,
   a second enclosure, referred to hereafter as the pre-vacuum enclosure, containing a gas at a predetermined pressure, wherein the first bellows separates the gas in the pre-vacuum enclosure from the vacuum dielectric in the first vacuum enclosure, and
wherein the drive means is disposed outside the first and the second enclosure of the vacuum variable capacitor, the drive means is coupled to a driven means by a magnetic coupling, and the magnetic coupling comprises a shielding to be shielded from electromagnetic fields.

2. A vacuum variable capacitor according to claim 1, wherein the drive means comprises a contact free transfer of movement to a driven means inside an enclosure of the vacuum variable capacitor.

3. A vacuum variable capacitor according to claim 1, wherein the drive means comprises a stepper motor.

4. A vacuum variable capacitor according to claim 1, wherein the predetermined pressure of the second enclosure is lower than atmospheric pressure.

5. A vacuum variable capacitor according to claim 1, comprising an insulation element for electrically insulating the drive means and/or the motor from a variable mounting plate of the first vacuum enclosure.

6. A vacuum variable capacitor according to claim 1, wherein the first vacuum enclosure and the second vacuum enclosure are separately arranged such that the drive means is insulated from a high voltages present at electrodes of the vacuum capacitor.

7. A vacuum variable capacitor according to claim 1, comprising a third enclosure comprising a second deformable wall region, referred to hereafter as second bellows, separating third enclosure from the pre-vacuum enclosure, wherein the first bellows is mechanically linked to the second bellows.

8. A vacuum variable capacitor according to claim 7, wherein the second bellows is substantially identical to the first bellows.

9. A vacuum variable capacitor according to claim 1, wherein the drive means comprise a voice coil or other linear drive.

10. A vacuum variable capacitor according to claim 1, wherein the drive means are configured such that a motor force supplied by a motor and transmitted to the mobile electrode is not transmitted through a threaded connection.

11. A vacuum variable capacitor according to claim 1, wherein the driven means comprise a lead screw and a nut, and wherein the screw and/or the nut comprise a ceramic material.

12. A vacuum variable capacitor according to claim 1, wherein the electrodes, the drive means and the pre-determined pressure in the pre-vacuum enclosure are configured so that the minimum adjustment time between the minimum capacitance value and the maximum capacitance value is less than 0.1 s.

13. A vacuum variable capacitor according to claim 1, wherein the maximum capacitance value is at least 10 times greater than the minimum capacitance value.

* * * * *